United States Patent [19]

Peters et al.

[11] 4,453,179

[45] Jun. 5, 1984

[54] VARIABLE COLOR CATHODOLUMINESCENT COMPOSITION, METHOD, AND DISPLAY DEVICE UTILIZING SAME

[75] Inventors: Thomas E. Peters, Chelmsford; James R. McColl, Concord, both of Mass.

[73] Assignee: GTE Laboratories Incorporated, Waltham, Mass.

[21] Appl. No.: 375,791

[22] Filed: May 7, 1982

[51] Int. Cl.³ .................. H01J 29/20; H04N 9/27; C09K 11/10; H01J 29/52
[52] U.S. Cl. .................................... 358/72; 315/383; 313/467; 252/301.6 P
[58] Field of Search ............... 313/467; 252/301.4 F, 252/301.6 F, 301.6 P; 315/383; 358/56, 64, 72, 75

[56] References Cited

U.S. PATENT DOCUMENTS

| | | | |
|---|---|---|---|
| 2,176,099 | 10/1939 | Pfanstiehl | 252/301.6 F |
| 2,182,087 | 12/1939 | Leverenz | 252/646 |
| 2,238,026 | 4/1941 | Moore | 252/301.6 F |
| 2,247,192 | 6/1941 | Fonda | 252/301.6 F |
| 2,252,500 | 8/1941 | Fonda | 252/301.6 F |
| 2,537,262 | 1/1951 | Ellefson | 428/328 |
| 2,554,999 | 5/1951 | Merrill | 252/301.6 F |
| 2,969,474 | 1/1961 | Roberts et al. | 358/64 X |
| 3,416,019 | 12/1968 | Kaduk | 252/301.6 F X |
| 3,586,635 | 6/1971 | Vanik | 252/301.6 F |
| 4,231,892 | 11/1980 | Chang et al. | 252/301.6 F |
| 4,315,190 | 2/1982 | Peters et al. | 252/301.6 F X |
| 4,336,313 | 6/1982 | Peters et al. | 252/301.6 F X |

OTHER PUBLICATIONS

*J. Phys. Chem.*, 46; 878–885 (1942) H. C. Froelich and G. R. Fonda, "Exaggerated Phosphorescence of Zinc Silicate Phosphors".

G. Gashurov and A. K. Levine, "A Low-Temperature Synthesis of Manganese Activated Zinc Silicate of Superior Crystallinity", *J. Electrochem Soc. Solid State Science*, 114:378–381 (1967).

Von K.-Th. Wilke "Schmelzmittelwirkung im $CaWO_4$ und $Zn_2SiO_4$:Mn," *Zeitschrift für Physikalische Chemie*, 224:51–56 (1963).

*Primary Examiner*—Palmer C. Demeo
*Assistant Examiner*—Sandra L. O'Shea
*Attorney, Agent, or Firm*—Jerry F. Janssen; Ivan L. Ericson

[57] ABSTRACT

A variable color cathodoluminescent manganese activated zinc silicate phosphor is disclosed. The zinc silicate host is modified by the addition of small amounts of aluminum and phosphorus. Variation in the current density of the cathode ray excitation produces emission varying from green to blue. The method of making the phosphor and a cathode ray tube device employing the phosphor is also disclosed.

4 Claims, 3 Drawing Figures

VARIABLE COLOR CATHODOLUMINESCENT COMPOSITION, METHOD, AND DISPLAY DEVICE UTILIZING SAME

BACKGROUND OF THE INVENTION

This invention relates to manganese activated zinc silicate phosphors. More particularly, it is concerned with variable color manganese activated zinc silicate phosphors which have been modified by the addition of aluminum and phosphorus, with a method for producing such phosphors, and with cathode ray tube display devices utilizing these phosphors.

Manganese activated zinc silicate (commercially designated as P1) is an efficient green-emitting phosphor finding wide application in devices such as data display cathode ray tubes.

U.S. Pat. No. 4,231,892 to Chang et al. discloses phosphors of the P1 type which have been modified by the addition of Group IIIA and Group VA elements to improve cathodoluminescent efficiency.

Individual phosphors which are capable of exhibiting a shift in the color emitted as a result of a change in the current density of cathodoluminescent excitation are known. For example, V. D. Meyer and F. C. Palilla in *J. Electrochem. Soc.*, 116:531–534 (1969) have shown that the cathodoluminescent emission of sulfide-type P-22R shifts toward shorter wavelengths with excitation by electron beams of increasing current density.

SUMMARY OF THE INVENTION

It has been found in accordance with one aspect of the present invention that a variable color cathodoluminescent composition consists essentially of manganese activated zinc silicate containing small amounts of aluminum and phosphorus having the general formula:

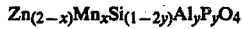

$$Zn_{(2-x)}Mn_xSi_{(1-2y)}Al_yP_yO_4$$

wherein x ranges between a lower non-zero value and an upper value of about 0.01, and y ranges between a lower non-zero value to an upper value of about 0.05.

Maintaining the concentration of the manganese activator at a level below a value of about 0.01 for x in the above formulation, while adding small amounts of aluminum and phosphorus to the zinc silicate host, results in a material which exhibits efficient cathodoluminescent emissions in two regions of the visible spectrum, one peaking at about 4000 Å and the other peaking at about 5230 Å. Variation in the current density of cathodoluminescent excitation causes the composition to emit a color varying from green to blue as the current density is increased.

In accordance with a second aspect of the present invention, a method of making a variable color manganese activated zinc silicate phosphor comprises the steps of blending zinc oxide, manganese carbonate or other compound of manganese thermally decomposable to manganese oxide, silicic acid, and aluminum phosphate, and firing the blend at a temperature between about 1000° C. and about 1300° C., preferably at about 1250° C., for a period sufficient to produce a luminescent composition having the general formula:

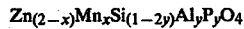

$$Zn_{(2-x)}Mn_xSi_{(1-2y)}Al_yP_yO_4$$

wherein x ranges between a lower non-zero value and an upper value of about 0.01, and y ranges between a lower non-zero value to an upper value of about 0.05.

In accordance with another aspect of the present invention, a variable color cathode ray tube display device comprises a sealed and evacuated envelope containing an electron gun assembly, and associated means for generating and varying the current of an electron beam. A screen of phosphor in accordance with the invention is deposited on a portion of the inner surface of the envelope. Variation in the current density of the electron beam striking the phosphor screen excites the screen to emit a color variable between green and blue dependent upon the magnitude of the electron beam current density.

For a better understanding of the present invention together with other and further objects, advantages and capabilities thereof, reference is made to the following disclosure and appended claims in connection with the above-described drawing figures.

DETAILED DESCRIPTION

Phosphors in accordance with the present invention are prepared by reacting blends of high purity zinc oxide, silicic acid, aluminum phosphate, and manganese carbonate or other manganese compound thermally decomposable to manganese oxide, at a temperature above about 1000° C., preferably at about 1200°–1300° C. for a period of about 4 hours. Higher firing temperatures (e.g., above about 1400° C.) produce dense sintered bodies of lower cathodoluminescent efficiency. The manganese content of the phosphors of this invention ranges between a lower value sufficient to produce cathodoluminescent emission peaking at about 5230 Å to an upper value of about 0.01 in the formulation. The relative amounts of aluminum and phosphorus employed in the composition are held substantially equal to insure charge balance in the final composition. The lowest amount of aluminum and phosphorus employed is that sufficient to produce efficient cathodoluminescence peaking at about 4000 Å, but greater than that of zinc silicate absent the aluminum and phosphorus. The upper amount of aluminum and phosphorus is about 0.05 in the formulation given above.

Cathodoluminescent compositions made in accordance with the above teachings were evaluated by settling thick layers of the phosphors on metal plaques. The plaques were mounted in an evacuated chamber provided with an electron gun. A 5 mm spot was excited on the phosphor by a 15 kV electron beam refreshed at a rate of 60 Hz with a variable dwell time. The light emitted by the excited phosphor was detected by a Tektronix Model J6523 narrow angle luminance probe. The current density of the cathodoluminescent excitation was varied by changing the dwell time of the electron beam, and the spectral distribution of the emission was detected and recorded. The data for a representative example of phosphors in accordance with the present invention appears in the accompanying table.

TABLE

| Phosphor = $Zn_{1.9965}Mn_{0.0035}Si_{0.98}Al_{0.01}P_{0.01}O_4$ | | |
|---|---|---|
| Beam Current Density | C.I.E. Chromaticity Coordinates | |
| (Dwell Time in $\mu$sec.) | x | y |
| 0.1 | 0.208 | 0.382 |
| 0.5 | 0.199 | 0.299 |
| 5.0 | 0.187 | 0.202 |

Figure 1:
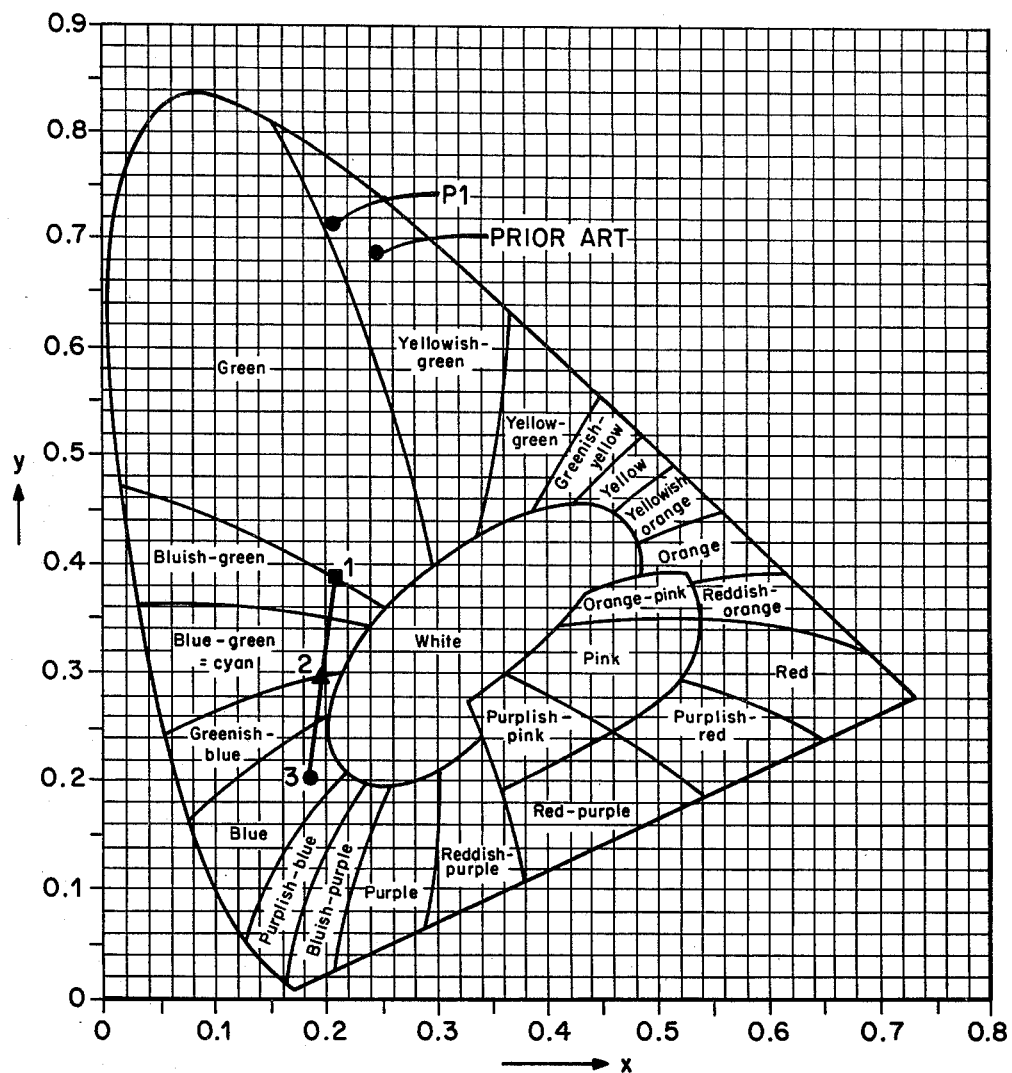
FIG. 1 is a reproduction of the C.I.E. chromaticity diagram showing the chromaticity coordinates of prior art manganese activated zinc silicate phosphors compared with the chromaticity coordinates of phosphors in accordance with one aspect of the present invention excited by an electron beam at various current densities.
Figure 2:
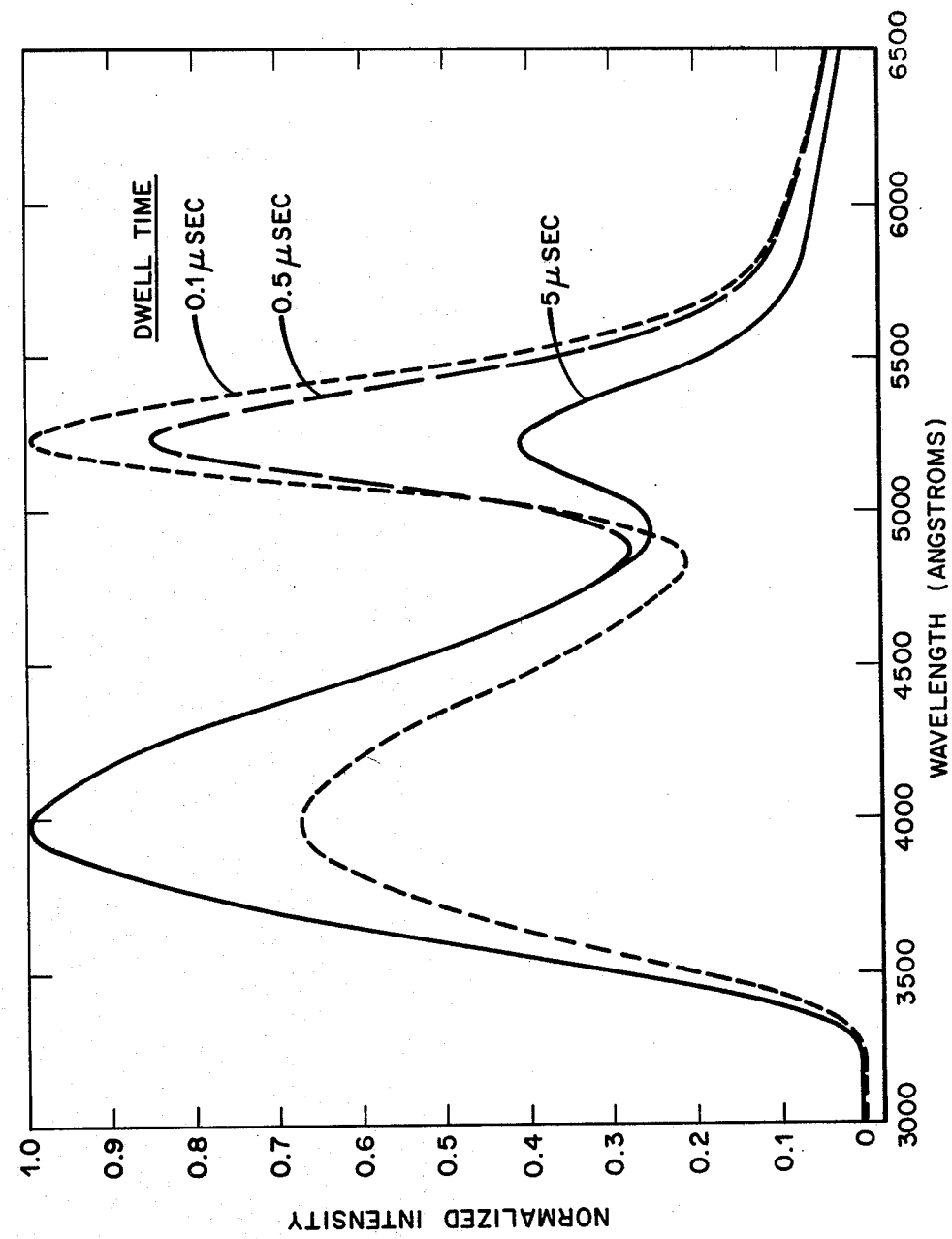
FIG. 2 is a graph illustrating the cathodoluminescence of a representative phosphor in accordance with one aspect of the present invention at three different levels of current density of electron beam excitation.

The emission spectra of the example appearing in the table are shown for various excitation current densities in FIG. 2 where it can be seen that there is a decrease in the cathodoluminescent emission at about 5320 Å and a corresponding increase in the cathodoluminescent emission at about 4000 Å as the beam dwell time is increased. The chromaticity coordinates of the phosphor under conditions of different current density have been plotted in the typical C.I.E. chromaticity diagram shown in FIG. 1 compared with the chromaticity coordinates of a commercial P1 phosphor and a prior art aluminum-phosphorus modified manganese activated zinc silicate phosphor. It can be seen by the data plotted in FIG. 2 that the P1 phosphor exhibits the characteristic yellowish-green emission of excited manganese, and that modification of the zinc silicate host with aluminum and phosphorus shifts the color only slightly when the manganese concentration in the zinc silicate host is relatively high.

In the phosphors of the present invention where the manganese concentration is maintained below a level corresponding to about 0.01 in the chemical formulation, excitation of the phosphor at low current densities (0.1 $\mu$sec· dwell time, point 1 in FIG. ) produces a bluish-green emission which shifts to blue as the current density is increased to 0.5 $\mu$sec· dwell time (point 2) and finally to 5 $\mu$sec· dwell time (point 3).

While not espousing one theory to the exclusion of others, it is believed that the maintenance of the manganese activator at low levels in modified zinc silicate phosphors of the present invention results in a phosphor where emission at low current densities is primarily the result of excitation of the manganese activator. At higher beam current densities, the relatively small number of manganese activator sites in the phosphor become saturated and the emission of the host zinc silicate dominates. The presence of the aluminum and phosphorus in the zinc silicate host appears to enhance the blue cathodoluminescent emission of the host. The efficient blue emission of the modified zinc silicate host under conditions of electron beam excitation is not generally observed when these phosphors are excited by ultraviolet light. Thus, the phosphors of this invention are particularly adapted for use in cathodoluminescent devices such as CRT tubes, especially where a variable color display is desired. The phosphors permit the fabrication of such a device without the usually required multiple phosphor screens and shadow mask assemblies.

Figure 3:
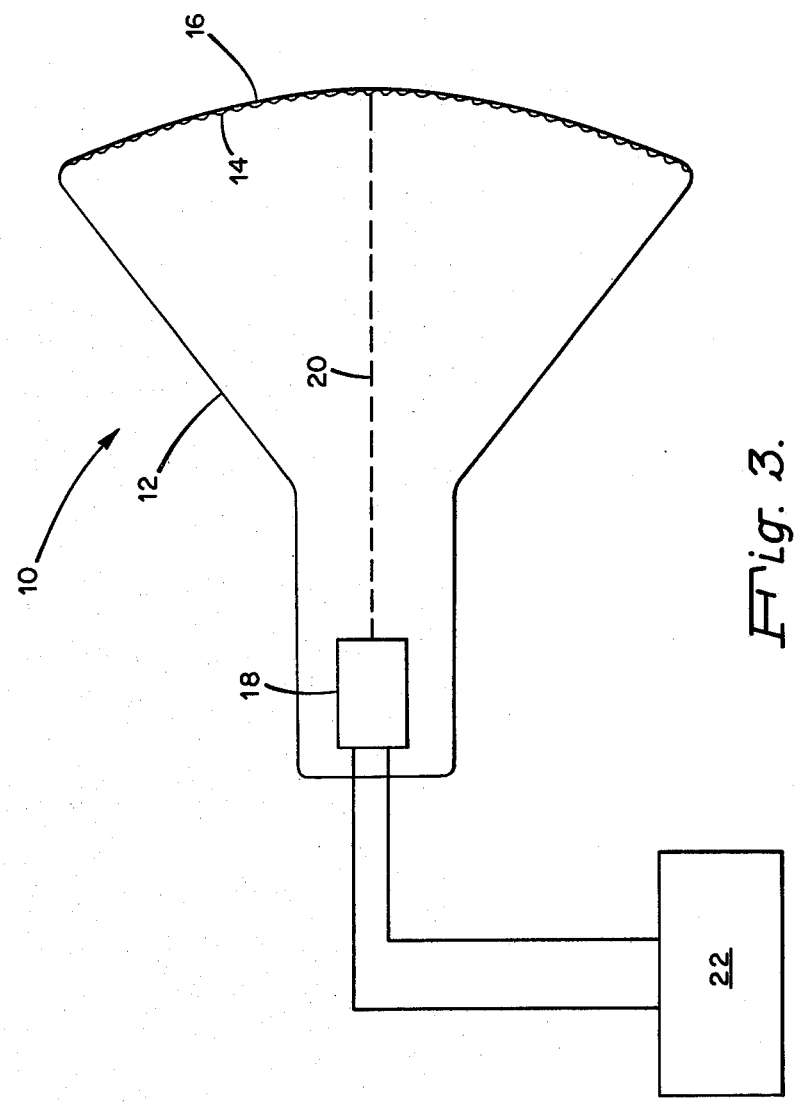
FIG. 3 is a schematic representation of a variable color CRT display device in accordance with another aspect of the present invention.

In FIG. 3 there is shown a variable color cathode ray tube display device 10 in accordance with this aspect of the present invention. The device comprises a sealed and evacuated envelope 12 having a screen 14 of phosphor in accordance with this invention deposited on the inner surface of the face portion 16 of the envelope. The envelope encloses an electron gun assembly 18 for exciting the phosphor screen 14 by means of electron beam 20. Associated electronic circuitry 22 of the conventional type known in the cathode ray tube art provides means for generating and varying the current of electron beam 20.

The phosphor screen 14 consists essentially of a manganese activated zinc silicate phosphor having a composition corresponding to the general formula:

$$Zn_{(2-x)}Mn_xSi_{(1-2y)}Al_yP_yO_4$$

wherein x ranges between a lower non-zero value sufficient to effect cathodoluminescent emission peaking at about 5230 Å and an upper value of about 0.01. The value of y ranges between a lower non-zero value, sufficient to effect cathodoluminescent emission peaking at about 4000 Å, but greater than that of the manganese activated zinc silicate composition absent the aluminum and phosphorus to an upper value of about 0.05. Excitation of the screen 14 by electron beam 20 at low current densities produces green emission peaking at about 5230 Å resulting from the manganese activator in the phosphor. Excitation of the screen 14 by electron beam 20 at higher current densities causes an increasing shift toward the blue emission peaking at about 4000 Å resulting from the aluminum-phosphorus modified zinc silicate host as the beam current is increased. Thus, a variable color display is produced in the CRT display device 10 by variably controlling the current of the excitation electron beam.

While there have been shown and described what are at present believed to be the preferred embodiments of the present invention, it will be obvious to one skilled in the art that various changes and modifications may be made therein without departing from the scope of the invention as defined by the appended claims.

What is claimed is:

1. A variable color cathode ray tube display device comprising an evacuated, sealed envelope containing an electron gun assembly, a screen of phosphor deposited on a portion of the inner surface of said envelope, means for generating an electron beam from said electron gun assembly, and means for varying the current of said electron beam, said phosphor consisting essentially of a material having the general formula:

$$Zn_{(2-x)}Mn_xSi_{(1-2y)}Al_yP_yO_4$$

wherein:

$0 < x \leq 0.01$ $0 < y \leq 0.05$, whereby variation in the current of said electron beam causes a change in the color of emission from said phosphor screen from green to blue.

2. A method of preparing a variable color manganese activated modified zinc silicate phosphor comprising the steps of blending zinc oxide, manganese carbonate or other manganese compound thermally decomposable to manganese oxide, silicic acid, and aluminum phosphate, and firing said blend at a temperature of between about 1000° C. and about 1300° C. for a period sufficient to produce a luminescent composition having the general formula:

$$Zn_{(2-x)}Mn_xSi_{(1-2y)}Al_yP_yO_4$$

wherein:

$0 < x \leqq 0.01$ $0 < y \leqq 0.05,$ said composition characterized by a change in cathodoluminescent emission color from green to blue with increasing current density of cathode ray excitation.

3. A method in accordance with claim 2 wherein said firing step is carried out at a temperature of about 1250° C.

4. A method for varying color emitted by a cathodoluminescent phosphor having the formula:

$$Zn_{(2-x)}Mn_xSi_{(1-2y)}Al_yP_yO_4$$

wherein $0 < x \leqq 0.01$ $0 < y \leqq 0.05$ from green to blue, said phosphor being deposited as a layer in a cathode ray tube; said method comprising:
 exciting the phosphor layer by an excitation electron beam at a low current density to produce a green emission peak at about 5230 Angstroms; and
 increasing the current density of said excitation electron beam to a higher current density to produce a blue emission peak at about 4000 Angstroms.

* * * * *